US011017013B2

(12) United States Patent
Zhang (10) Patent No.: US 11,017,013 B2
(45) Date of Patent: May 25, 2021

(54) IMAGE CACHE COLLABORATION BETWEEN CLIENTS IN REMOTE DESKTOP ENVIRONMENTS (71) Applicant: VMware, Inc., Palo Alto, CA (US)

(72) Inventor: Lizhu Zhang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 943 days.

(21) Appl. No.: 14/628,137

(22) Filed: Feb. 20, 2015

(65) Prior Publication Data
US 2016/0246787 A1 Aug. 25, 2016

(51) Int. Cl.
H04L 29/08 (2006.01)
G06F 16/51 (2019.01)
G06F 16/13 (2019.01)
G06F 16/172 (2019.01)

(52) U.S. Cl.
CPC ............ *G06F 16/51* (2019.01); *G06F 16/137* (2019.01); *G06F 16/172* (2019.01); *H04L 67/20* (2013.01); *H04L 67/2842* (2013.01)

(58) Field of Classification Search
CPC ...... G06F 16/51; G06F 16/137; G06F 16/172; H04L 67/20
See application file for complete search history.

(56) References Cited

U.S. PATENT DOCUMENTS

| 9,088,592 | B1 * | 7/2015 | Craft | ................ | H04L 67/06 |
| 2009/0055471 | A1 * | 2/2009 | Kozat | ............ | H04L 65/4084 |
| | | | | | 709/203 |
| 2010/0162126 | A1 * | 6/2010 | Donaldson | ........ | G06F 17/30902 |
| | | | | | 715/738 |
| 2010/0235581 | A1 * | 9/2010 | Anderson | ............ | G06F 12/0813 |
| | | | | | 711/130 |
| 2011/0295934 | A1 * | 12/2011 | McCormack | ........ | G06Q 10/107 |
| | | | | | 709/203 |
| 2012/0331307 | A1 * | 12/2012 | Fernandez Gutierrez | ................... |
| | | | | | G06F 12/0897 |
| | | | | | 713/190 |
| 2013/0138775 | A1 * | 5/2013 | Shah | ................... | H04L 67/2895 |
| | | | | | 709/219 |
| 2014/0156778 | A1 * | 6/2014 | Luxenberg | .......... | H04L 67/2842 |
| | | | | | 709/213 |
| 2014/0304326 | A1 * | 10/2014 | Wesley | .................. | H04L 67/10 |
| | | | | | 709/203 |

* cited by examiner

Primary Examiner — Beau D Spratt (57) ABSTRACT

Image cache collaboration is described to enable multiple clients to share image data in a remote desktop environment. A centralized cache manager maintains information about all image caches on all client devices which have established connections to the server. When an update to a portion of the GUI of a virtual desktop for a first client device is detected, the central cache manager can determine whether any other client devices contain the requested image data in their respective image caches. If such a device is identified, the server transmits a message to the first client device, identifying the second client device that contains the requested image data in its respective image cache. The first client device may then request and receive the image data from the second client device over the LAN on which both devices reside, thereby obtaining the data with less latency.

20 Claims, 5 Drawing Sheets

IMAGE CACHE COLLABORATION BETWEEN CLIENTS IN REMOTE DESKTOP ENVIRONMENTS

TECHNICAL FIELD

The present disclosure generally relates to caching image data and more particularly relates to enabling multiple client devices to share image cache data in remote desktop environments.

BACKGROUND

With the rising popularity of cloud computing, remote desktop environments, such as those based on Virtual Desktop Infrastructure (VDI) and Desktop-as-a-Service (DAAS) have become rapidly growing industries. In a conventional VDI or DAAS environment, a user is provisioned a virtual desktop and is allowed to access their virtual desktop over a remote network connection, such as a WAN connection. The virtual desktops are typically hosted on servers that reside in a data center of the enterprise (or a third party service provider), and each host server may execute multiple virtual desktops. Users can utilize a client device to remotely log into their individual virtual desktop and all of the application execution takes place on the remote host server which is linked to the local client device over network, using a remote display protocol such as remote desktop protocol (RDP), PC-over-IP (PCoIP) protocol, virtual network computing (VNC) protocol, or the like. Using such a remote desktop protocol, the user can interact with applications of the virtual desktop, which are running on the remote host server, such that only the display (i.e., image data), keyboard, and mouse information is communicated with the local client device. A common implementation of this approach is to host multiple desktop operating system instances on a server hardware platform running a hypervisor.

In many ways, VDI and DAAS provide a more centralized and efficient computing environment because each user is able to access their individual desktop from any device capable of making a network connection and from virtually any location. All of the user data is stored in the cloud (e.g., in a data center), providing more centralized management and quality of control for the organization that may employ the individual users.

However, a number of inconveniences and inefficiencies still remain in the context of virtual desktop environments. One form of inefficiency stems from the bandwidth and latency limitations of a wide area network (WAN) connection (e.g., Internet connection) that is typically utilized between the client device and the remote server. Because large amounts of image data need to be communicated from the virtual desktop to the client device, network limitations may cause the interface presented at the client device to appear choppy, visually distorted or unresponsive at times. What is needed is a more efficient way to deliver the image information to the client device in order to improve the experience of the end user accessing the virtual desktop.

DETAILED DESCRIPTION

Systems and methods in accordance with various embodiments of the present disclosure overcome at least some of the above mentioned shortcomings and deficiencies by providing more efficient ways to deliver image data and other graphical user interface (GUI) information to client devices in remote desktop environments. In particular, embodiments described herein enable multiple client devices to collaborate and share the image data between their individual image caches when accessing their respective virtual desktops.

As used throughout this disclosure, the terms "remote desktop, "virtual desktop" and "desktop" are used interchangeably and refer to an instance of an operating system or application that runs remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user that owns the virtual desktop can remotely log into their virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the GUI was actually running on the local client device even though the desktop is actually executing remotely.

As previously mentioned, the network bandwidth and latency limitations in such an environment may present a number of challenges that may impact the end user experience because substantial amounts of image data need to be communicated from the virtual desktop to the client device very quickly. This is particularly significant in situations where the user is providing a lot of input that causes various portions of the GUI to be updated, such as rapidly moving windows, scrolling pages, and the like. If the client device is unable to update the interface presented to the user fast enough, (e.g., due to slow network connection), the user experience is significantly degraded. In order to improve performance in such situations, client devices typically only request the modified image data to be transmitted, rather than sending the entire desktop interface each time over the network. In most cases, when a user or an application causes updates to the GUI of the remotely running desktop, only a portion of the GUI is modified rather than the entire page. For example, when a user drags a window from one location on the desktop to another, only those portions of the GUI that are actually showing the window are modified, whereas the remaining portions of the GUI stay unchanged. For this reason, it is advantageous to only transmit the image data for the changes to the interface since the client is assumed to already have the necessary information to display the portions of the interface that remain unchanged.

In order to provide additional improvements to network inefficiencies, some client devices utilize an image cache that locally stores certain types of image data associated with the GUI of the remote desktop. For example, image data that is likely to be reused in subsequent updates to the desktop interface can be placed in an in-memory cache rather than being discarded. Client devices equipped with such a cache are able to utilize it to render portions of the desktop interface without having to receive those portions again from the server over the network. For example, during an update of the GUI, the server may first transmit a hash key for each portion of the interface that is to be updated. The client can check whether the image data associated with the hash key is already present in the cache and if such an entry exists, that portion of the image data does not need to be downloaded from the server. The use of the image cache in this manner decreases the amount of data that needs to be transmitted over the network and thereby improves performance of the virtual desktop. However, as the image cache on any single client is limited in size, in many cases, the image cache on a client does not contain the image data necessary to update the GUI and these updates still need to be conveyed to the client over the network.

At this point, it is worth mentioning that desktop interface image data has certain unique characteristics when compared to other types of image information, such as video or digital photographs. One such unique characteristic is that a relatively large amount of desktop image data is similar or identical between many client devices. For example, certain icons, backgrounds, menu bars, window regions and other areas of the interface are frequently the same across two or more devices. It can therefore be advantageous for multiple clients to share such desktop image data in order to reduce the amount of information that needs to be transmitted from the remote desktop server. This is particularly true in deployments where all client devices are on the same local area network (LAN), while the remote desktop server is located on a different LAN and is contacted via a WAN connection—i.e., a situation that is common in typical VDI deployments. Because WAN connections are usually orders of magnitude slower than LAN connections, enabling a client device to obtain the necessary image data from another client on the same LAN can drastically improve the speed of delivery of the required image data. As such, for the purposes of updating the GUI of a remote desktop in a highly responsive manner, the embodiments described herein utilize image cache collaboration between multiple client devices.

To enable the image cache collaboration, a centralized cache manager is deployed on a server (e.g., connection broker) that enables virtual desktop connections between multiple clients. The cache manager maintains information about all of the image caches on all client devices which have established connections to the server. When update for a portion of the GUI of a virtual desktop is detected for a first client device, the central cache manager determines whether any other client devices contain the requested image data in their respective image caches. For example, in one embodiment, the cache manager may determine whether any client device located on the same LAN as the requesting device contains the requested image data. If such a device is identified, the server sends a message to the first client device, identifying the second client device that contains the requested image data in its respective image cache. The first client device may then request and receive the image data from the second client device over the LAN on which both devices reside and thereby obtain the needed image data with much less latency.

Figure 1:
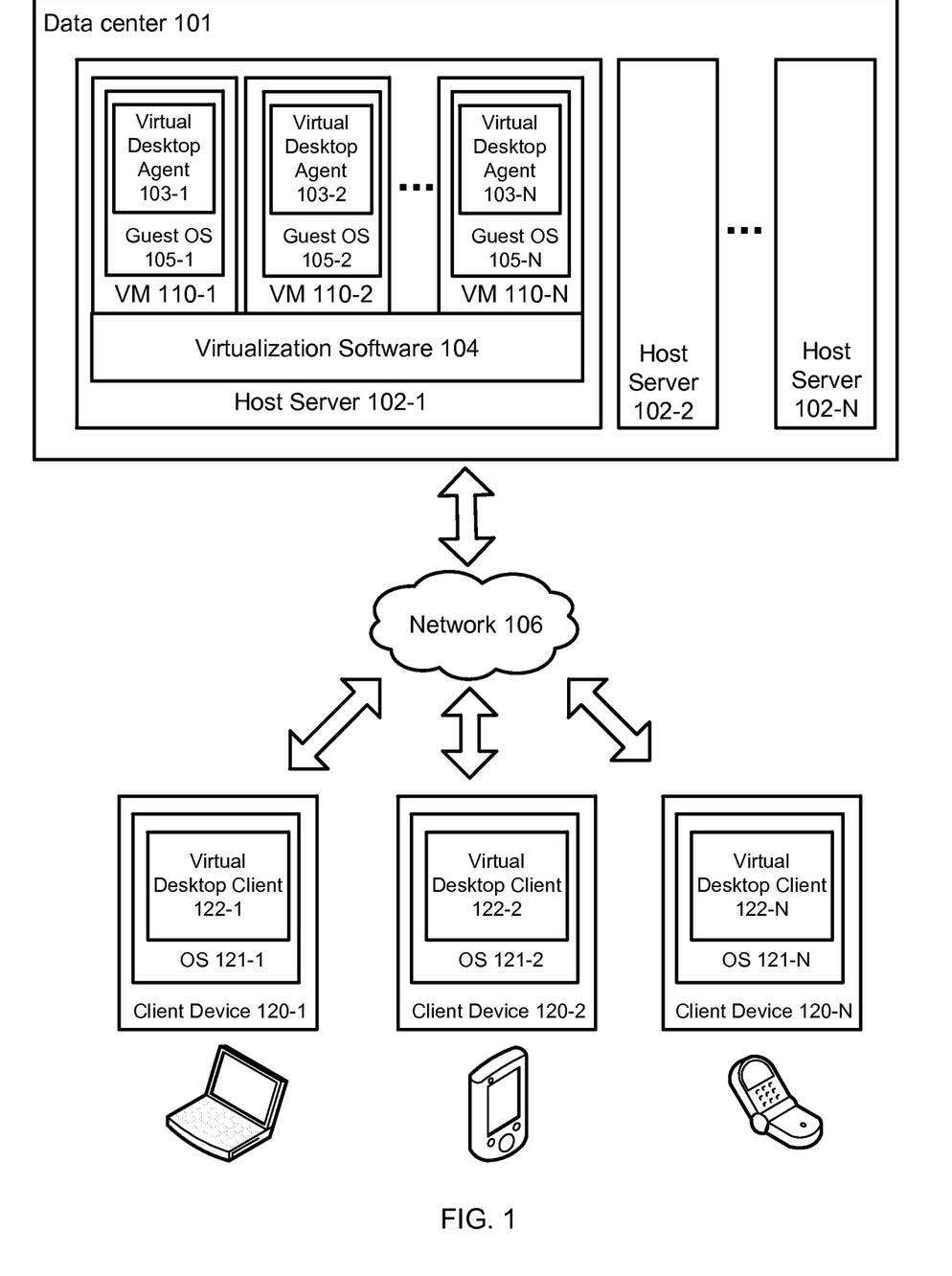
FIG. 1 illustrates an example of a virtual desktop infrastructure (VDI) environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Particularly for purposes of this disclosure, the network connection between the client devices and the host servers is most commonly an Internet connection. Network 106 may further include numerous other components, such as one or more firewalls, connection brokers, management servers, etc., which are not shown here so as to not obscure salient features of the VDI environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102. In this context, the term "desktop" refers to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client application (e.g., 122-1, 122-2, 122-N). The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
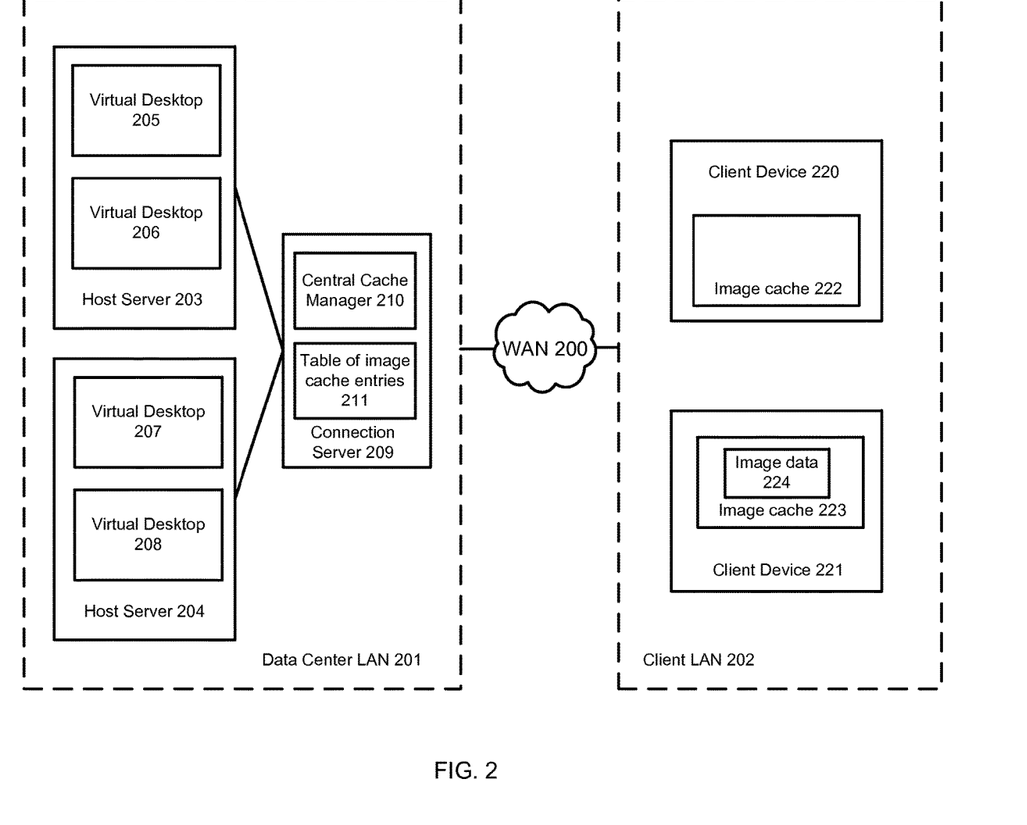
FIG. 2 illustrates an example of a system that utilizes client image cache collaboration, in accordance with various embodiments.

FIG. 2 illustrates an example of a system that utilizes client image cache collaboration, in accordance with various embodiments. In this illustration, the connection server 209, as well as the host servers (203, 204) which are running the virtual desktops (205, 206, 207, 208) are physically located in the same data center and are therefore all connected on the same local area network (LAN) 201. The client devices (220, 221) are physically located in another geographic location (e.g., in the offices of an enterprise) and connected on a different LAN 202. Any communications between the two networks is performed using a WAN 200 connection, such as an Internet connection.

The connection server 209 is responsible for establishing connection sessions for each client device to their individual virtual desktops, which are running on host servers in the data center. The connections server 209 can authenticate users (e.g., based on user name and password combinations) and assign virtual desktops to each user. In various embodiments, the connection server 209 includes a central cache manager 210 that enables client image cache collaboration, as described throughout this disclosure. The central cache manager 210 is responsible for maintaining information about which image data is present on all image caches (222, 223) of the client devices connected to the server 209. For example, as shown in this example, the cache manager 210 maintains a table of image cache entries 211, where each entry is a hash key of the image data for a portion of the interface (e.g., n square pixel area of the page) and the internet protocol (IP) address of the client device on which the image data corresponding with the hash key is present.

When an update to a virtual desktop for a client (e.g., client 220) is generated on one of the host servers, the virtual desktop agent first sends an image hash key to the central cache manager 210, rather than sending the hash key directly to the client 220. As mentioned above, the cache manager 210 knows about the contents of all image caches of all clients that are connected to the connection server 209. In response to receiving the image hash key from the virtual desktop agent, the cache manager 210 checks whether any other client has the image data needed to update the GUI on client 220, such as by matching the received hash key to the table of image cache entries 211. If no other client device contains the necessary image data, the image data can be transmitted from the host server running the virtual desktop over the WAN connection (and the cache manager may update the table of cache entries to reflect the fact that the image data was delivered to client 220).

In this example, however, the cache manager determines that the image cache 223 on client device 221 contains the image data 224 required to update desktop interface on client device 220. The cache manager 210 then transmits a message containing the image hash key and the information identifying client device 221 (e.g., IP address of client device 221) to the client device 220. When the client device 220 receives the message, it contacts the client device identified in the message and requests the image data 224 from client device 221. This can be implemented in multiple ways. One implementation may utilize a transfer control protocol (TCP) socket connection. For example, the client device 221 may be configured to listen to a designated port (e.g., L_PORT) for sending image cache data. When client device 220 receives a message with the IP address of client device 221, client device 220 starts a TCP connection with client device 221 using the IP address and the designated port (i.e., L_PORT). Client 220 thereafter requests the image data from client device 221 using the image hash key received from the cache manager. Client 221 then transmits the image data 224 associated with the specified hash key from its image cache 223 to client device 220. In this manner, client device 220 is able to obtain the image data from another client on the same LAN, rather than having to download the data over a WAN connection.

In order to maintain the table of image cache entries, the cache manager needs to know with at least some amount of certainty about the contents of each image cache on each client device connected to the server. In some embodiments, this may be implemented by using an agreed upon caching algorithm, where the cache manager can determine whether the image data will be cached whenever any image data is transmitted from the server to each client. Alternatively, in other embodiments, this information may be provided to the cache manager in other ways, such as by synchronizing image hash key entries with each client device, or the like.

Figure 3:
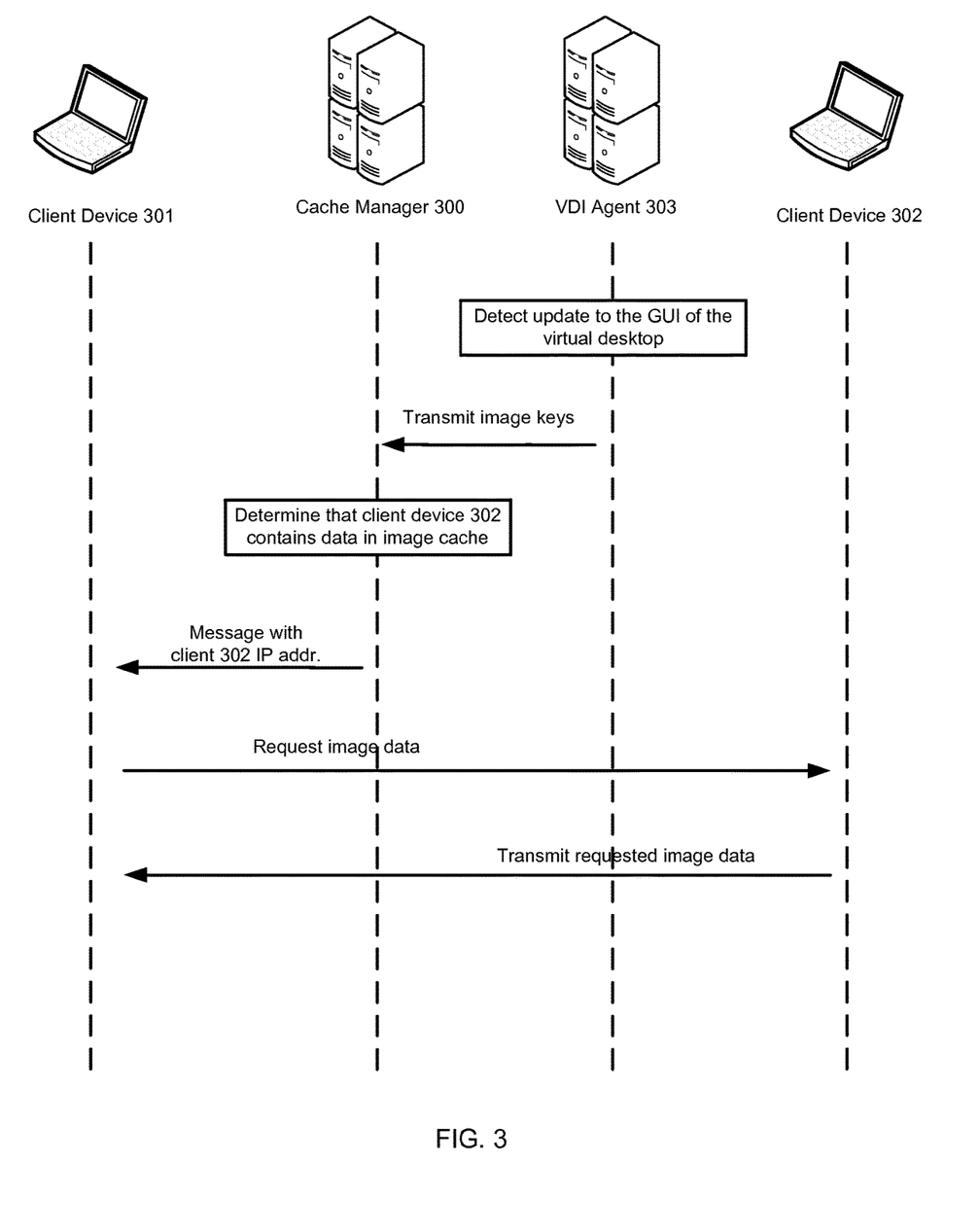
FIG. 3 illustrates an example of the communication flow between the cache manager and the client devices, in accordance with various embodiments.

FIG. 3 illustrates an example of the communication flow between the cache manager and the client devices, in accordance with various embodiments. As illustrated in this example, the communication flow begins when an update is generated by on a virtual desktop running on a server. This can occur for example, when a user using the virtual desktop provides some input that causes the virtual desktop to generate an update the GUI, such as for example input requesting a new window to be opened, an application to be started, a drag operation, a window close operation, a scroll operation or any other operation that can cause a change to the desktop interface. When an update to the GUI is generated for the client device 301, the virtual desktop agent 303 operating on the remote desktop server computes a hash key for each portion of the interface to be updated and transmits those hash image keys to the cache manager 300. The cache manager 300 determines whether any other client device contains the image data needed to update the interface of client device 301. This can be performed by the cache manager 300 attempting to match each hash key to the table of image cache entries for all client devices, as previously mentioned.

When the cache manager 300 determines that client device 302 contains the image data matching one of the hash keys received from the virtual desktop agent 303, the cache manager sends a message to client device 301, containing the image hash key and the information identifying client device 302. When the client device 301 receives the message from the cache manager 300, it requests the image data from the client device 302 using the information in the message and client 302 responds by providing the necessary image data to client device 301.

Figure 4:
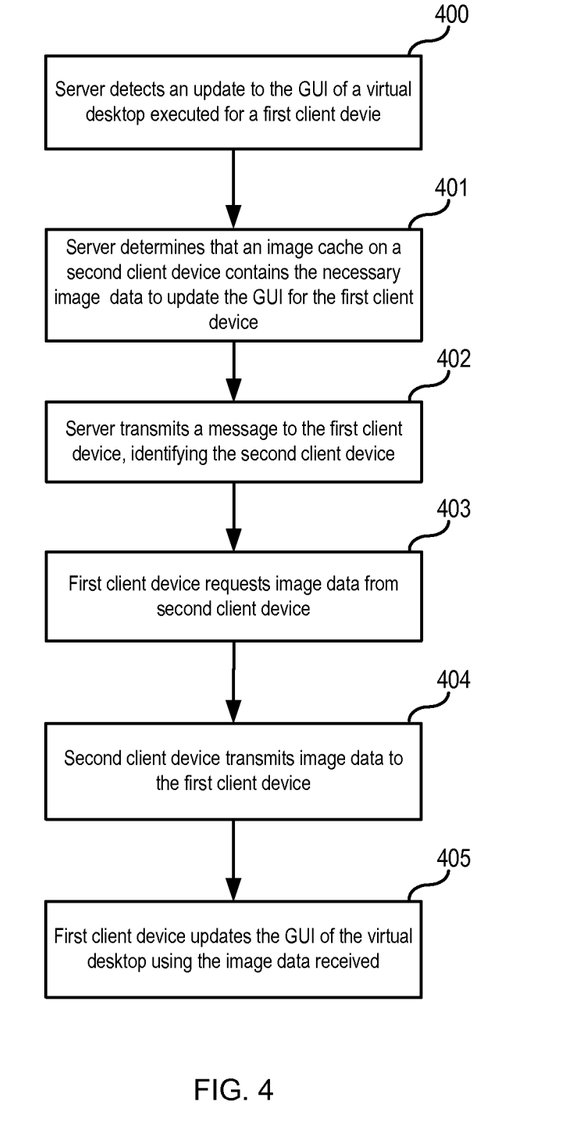
FIG. 4 illustrates an example of a process flow for enabling image cache collaboration between clients in a remote desktop environment, in accordance with various embodiments.

FIG. 4 illustrates an example of a process flow for enabling image cache collaboration between clients in a remote desktop environment, in accordance with various embodiments. In operation 400, the cache manager operating on a connection server detects an update to the graphical user interface (GUI) of a virtual desktop executed for a first client device. In one embodiment, this detecting step is performed by the cache manager receiving a hash key from the virtual desktop agent when the agent detects an update to the virtual desktop. In operation 401, the cache manager determines that an image cache on a second client device currently contains image data needed to update the GUI of the virtual desktop for the first client device. In one embodiment, this is performed by matching the hash key to a table of image cache entries for image caches of all client devices. In operation 402, the cache manager transmits a message to the first client device identifying the second client device that contains the image data. In operation 403, the first client device requests the image data from the second client device in response to receiving the message from the cache manager. In operation 404, the second client device transmits the image data to the first client device and in operation 405, the first client device uses the image data to update the interface displayed to the user.

Figure 5:
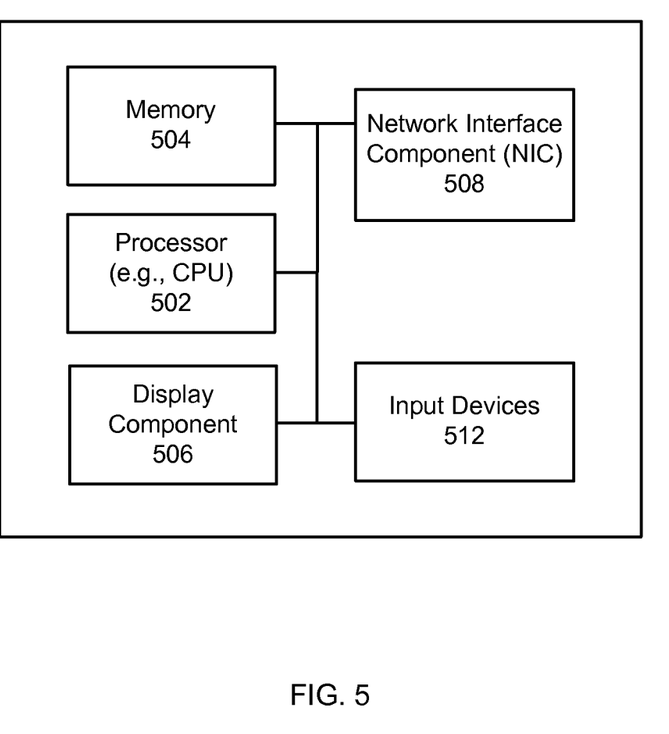
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The computing device typically can further comprise a display component 506, such as a monitor, a touch screen, liquid crystal display (LCD), or the like. In various embodiments, the computing device will include at least one input device 508 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing image cache collaboration between multiple client devices in a remote desktop environment, the method comprising:
   detecting, by a virtual desktop agent executing on a host server, an update to at least a portion of a graphical user interface (GUI) of a virtual desktop executed on the host server for a first client device;
   transmitting an image hash key of the update from the virtual desktop agent executing on the host server to a central cache manager executing on a connection server, wherein the connection server is a separate device from the host server and is configured to establish virtual desktop connection sessions for each of the client devices;
   determining, by the central cache manager, that an image cache on a second client device currently contains image data needed to update the GUI of the virtual desktop for the first client device, wherein the central cache manager knows the contents of all image caches of each of the client devices that are connected to the connection server by using an agreed upon caching algorithm between the central cache manager and the client devices, wherein the agreed upon caching algorithm enables the central cache manager to determine, at the time of transmitting the image data to the client devices, whether the image data will be cached by the client devices; and
   transmitting a message, from the central cache manager executing on the connection server to the first client device identifying the second client device that contains the image data, wherein the first client device requests the image data from the second client device in response to receiving said message.

2. The method of claim 1, further comprising:
   maintaining a table storing entries associating image hash keys with client devices, wherein each image hash key corresponds to a set of image data for a portion of the GUI, the set of image data stored on a client device identified by the corresponding entry in the table.

3. The method of claim 1, wherein the first client device and the second client device reside within a first local area network (LAN) and wherein the server resides in a second LAN that is separate and distinct from the first LAN, and wherein the first client device and the second client device connect to the server over a wide area network (WAN) connections.

4. The method of claim 1, wherein the second client device is configured to listen on a specified port designated for sending image cache data, and wherein:
   in response to receiving the message, the first client obtains the internet protocol (IP) address of the second client and establishes a transfer control protocol (TCP) connection with the second client at the specified port.

5. The method of claim 4, wherein the first client requests the image data from the second client using the connection and the second client transmits the image data from the image cache of the second client to the first client.

6. The method of claim 1, wherein the virtual desktop is executed on a virtual machine managed by a hypervisor executed on the server, the virtual machine associated with a user of the first client device.

7. The method of claim 1, wherein the central manager includes a table of image cache entries representing content in all image caches of every client device connected to the connection server.

8. A non-transitory computer readable storage medium comprising one or more sequences of instructions, the instructions when executed by one or more processors causing the one or more processors to execute the operations of:
   detecting, by a virtual desktop agent executing on a host server, an update to at least a portion of a graphical user interface (GUI) of a virtual desktop executed on the host server for a first client device;
   transmitting an image hash key of the update from the virtual desktop agent executing on the host server to a central cache manager executing on a connection server, wherein the connection server is a separate device from the host server and is configured to establish virtual desktop connection sessions for each of the client devices;
   determining, by the central cache manager, that an image cache on a second client device currently contains image data needed to update the GUI of the virtual desktop for the first client device, wherein the central cache manager knows the contents of all image caches of each of the client devices that are connected to the connection server by using an agreed upon caching algorithm between the central cache manager and the client devices, wherein the agreed upon caching algorithm enables the central cache manager to determine, at the time of transmitting the image data to the client devices, whether the image data will be cached by the client devices; and transmitting a message, from the central cache manager executing on the connection server to the first client device identifying the second client device that contains the image data, wherein the first client device requests the image data from the second client device in response to receiving said message.

9. The non-transitory computer readable storage medium of claim 8, further comprising instructions to cause the one or more processors to:

maintain a table storing entries associating image hash keys with client devices, wherein each image hash key corresponds to a set of image data for a portion of the GUI, the set of image data stored on a client device identified by the corresponding entry in the table.

10. The non-transitory computer readable storage medium of claim 8, wherein the first client device and the second client device reside within a first local area network (LAN) and wherein the server resides in a second LAN that is separate and distinct from the first LAN, and wherein the first client device and the second client device connect to the server over a wide area network (WAN) connections.

11. The non-transitory computer readable storage medium of claim 8, wherein the second client device is configured to listen on a specified port designated for sending image cache data, and wherein:

in response to receiving the message, the first client obtains the internet protocol (IP) address of the second client and establishes a transfer control protocol (TCP) connection with the second client at the specified port.

12. The non-transitory computer readable storage medium of claim 11, wherein the first client requests the image data from the second client using the connection and the second client transmits the image data from the image cache of the second client to the first client.

13. The non-transitory computer readable storage medium of claim 8, wherein the virtual desktop is executed on a virtual machine managed by a hypervisor executed on the server, the virtual machine associated with a user of the first client device.

14. The non-transitory computer readable storage medium of claim 8, wherein the central manager includes a table of image cache entries representing content in all image caches of every client device connected to the connection server.

15. A computing system, comprising:
one or more processors; and
memory including instructions that when executed by the one or more processors, cause the computing system to:
detect, by a virtual desktop agent executing on a host server, an update to at least a portion of a graphical user interface (GUI) of a virtual desktop executed on the host server for a first client device;
transmit an image hash key of the update from the virtual desktop agent executing on the host server to a central cache manager executing on a connection server, wherein the connection server is a separate device from the host server and is configured to establish virtual desktop connection sessions for each of the client devices;
determine, by the central cache manager, that an image cache on a second client device currently contains image data needed to update the GUI of the virtual desktop for the first client device, wherein the central cache manager knows the contents of all image caches of each of the client devices that are connected to the connection server by using an agreed upon caching algorithm between the central cache manager and the client devices, wherein the agreed upon caching algorithm enables the central cache manager to determine, at the time of transmitting the image data to the client devices, whether the image data will be cached by the client devices; and
transmit a message, from the central cache manager executing on the connection server to the first client device identifying the second client device that contains the image data, wherein the first client device requests the image data from the second client device in response to receiving said message.

16. The computing system of claim 15, wherein the memory further includes instructions that cause the computing system to:

maintain a table storing entries associating image hash keys with client devices, wherein each image hash key corresponds to a set of image data for a portion of the GUI, the set of image data stored on a client device identified by the corresponding entry in the table.

17. The computing system of claim 15, wherein the first client device and the second client device reside within a first local area network (LAN) and wherein the computing device resides in a second LAN that is separate and distinct from the first LAN, and wherein the first client device and the second client device connect to the computing device over wide area network (WAN) connections.

18. The computing system of claim 15, wherein the second client device is configured to listen on a specified port designated for sending image cache data, and wherein:

in response to receiving the message, the first client obtains the internet protocol (IP) address of the second client and establishes a transfer control protocol (TCP) connection with the second client at the specified port.

19. The computing system of claim 18, wherein the first client requests the image data from the second client using the connection and the second client transmits the image data from the image cache of the second client to the first client.

20. The computing system of claim 15, wherein the virtual desktop is executed on a virtual machine managed by a hypervisor executed on the computing device, the virtual machine associated with a user of the first client device.

* * * * *